United States Patent
Haberaecker et al.

(10) Patent No.: US 8,571,973 B1
(45) Date of Patent: Oct. 29, 2013

(54) ELECTRONIC CLOSING

(75) Inventors: Charlotte Haberaecker, Annandale, VA (US); J. Harvey Trimble, Jr., Great Falls, VA (US); Mark A. Oliphant, Easton, MD (US)

(73) Assignee: CoreLogic Solutions, LLC, Irvine, CA (US)

( * ) Notice: Subject to any disclaimer, the term of this patent is extended or adjusted under 35 U.S.C. 154(b) by 3069 days.

(21) Appl. No.: 10/730,266

(22) Filed: Dec. 9, 2003

Related U.S. Application Data

(60) Provisional application No. 60/431,847, filed on Dec. 9, 2002.

(51) Int. Cl.
G06Q 40/00 (2012.01)
G06Q 40/02 (2012.01)

(52) U.S. Cl.
CPC .................................. G06Q 40/025 (2013.01)
USPC ........................................................ 705/38

(58) Field of Classification Search
None
See application file for complete search history.

(56) References Cited

U.S. PATENT DOCUMENTS

| | | | |
|---|---|---|---|
| 5,615,268 A | 3/1997 | Bisbee et al. | |
| 5,748,738 A | 5/1998 | Bisbee et al. | |
| 6,189,009 B1 | 2/2001 | Stratigos et al. | |
| 6,209,095 B1 | 3/2001 | Anderson et al. | |
| 6,237,096 B1 | 5/2001 | Bisbee et al. | |
| 6,289,460 B1 | 9/2001 | Hajmiragha | |
| 6,367,013 B1 | 4/2002 | Bisbee et al. | |
| 6,438,526 B1 | 8/2002 | Dykes et al. | |
| 6,452,614 B1 | 9/2002 | King et al. | |
| 6,456,981 B1 | 9/2002 | Dejaeger et al. | |
| 6,594,633 B1 | 7/2003 | Broerman | |
| 6,609,200 B2 | 8/2003 | Anderson et al. | |
| 6,635,089 B1 | 10/2003 | Burkett et al. | |
| 6,751,632 B1 | 6/2004 | Petrogiannis | |
| 7,085,735 B1 * | 8/2006 | Hall et al. ....................... 705/26 |
| 2001/0005829 A1 | 6/2001 | Raveis | |
| 2001/0018739 A1 | 8/2001 | Anderson et al. | |
| 2001/0029482 A1 | 10/2001 | Tealdi et al. | |
| 2001/0044764 A1 | 11/2001 | Arnold | |

(Continued)

FOREIGN PATENT DOCUMENTS

| | | |
|---|---|---|
| JP | 2003256744 | 9/2003 |
| WO | WO0008541 | 2/2000 |

(Continued)

OTHER PUBLICATIONS

Jean Waland, Communication Networks: A First Course, 1991, Richard D. Irwin, Inc. and Aksen Associates, Inc., pp. 121-128.*

(Continued)

*Primary Examiner* — Ella Colbert
*Assistant Examiner* — Scott S Trotter
(74) *Attorney, Agent, or Firm* — Knobbe, Martens, Olson & Bear, LLP

(57) ABSTRACT

An electronic closing platform facilitates provision of a variety of closing services for lenders, closing agents, borrowers or other parties to closing transactions. Electronic quality control procedures are invoked for closing data and documents whether they are in electronic or paper form. The platform is independently accessible and therefore accommodates data sharing between mortgage industry participants. Electronic signature capabilities, including a batch signing functionality, and tamper evident sealing after signing accommodate improved processing and system integrity. Additional features include registry filing, an electronic vault for storing electronic documents, and electronic recording.

30 Claims, 13 Drawing Sheets

(56) References Cited

U.S. PATENT DOCUMENTS

| | | |
|---|---|---|
| 2002/0010679 A1 | 1/2002 | Felsher |
| 2002/0019838 A1 | 2/2002 | Petrogiannis |
| 2002/0029194 A1 | 3/2002 | Lewis et al. |
| 2002/0035578 A1 | 3/2002 | Stratigos et al. |
| 2002/0049624 A1 | 4/2002 | Raveis |
| 2002/0052814 A1 | 5/2002 | Ketterer |
| 2002/0059137 A1 | 5/2002 | Freeman et al. |
| 2002/0069358 A1 | 6/2002 | Silvester |
| 2002/0073020 A1 | 6/2002 | McFarland et al. |
| 2002/0078159 A1 | 6/2002 | Petrogiannis et al. |
| 2002/0091651 A1 | 7/2002 | Petrogiannis et al. |
| 2002/0116321 A1 | 8/2002 | Arehart |
| 2002/0116331 A1 | 8/2002 | Cataline et al. |
| 2002/0116531 A1 | 8/2002 | Chu |
| 2002/0128969 A1 | 9/2002 | Parmelee et al. |
| 2002/0129256 A1 | 9/2002 | Parmelee et al. |
| 2002/0129257 A1 | 9/2002 | Parmelee et al. |
| 2002/0143711 A1 | 10/2002 | Nassiri |
| 2002/0169702 A1 | 11/2002 | Eaton, Jr. et al. |
| 2002/0178035 A1 | 11/2002 | Lajouanie |
| 2003/0009418 A1 | 1/2003 | Green et al. |
| 2003/0036994 A1 | 2/2003 | Witzig et al. |
| 2003/0055783 A1 | 3/2003 | Cataline et al. |
| 2003/0074297 A1 | 4/2003 | Carragher |
| 2003/0110400 A1 | 6/2003 | Cartmell et al. |
| 2003/0120588 A1 | 6/2003 | Dodd et al. |
| 2003/0144948 A1 | 7/2003 | Cleary et al. |
| 2003/0158811 A1 | 8/2003 | Sanders et al. |
| 2003/0172296 A1 | 9/2003 | Gunter |
| 2003/0172297 A1 | 9/2003 | Gunter |
| 2003/0172298 A1 | 9/2003 | Gunter et al. |
| 2003/0172299 A1 | 9/2003 | Gunter |
| 2003/0177071 A1 | 9/2003 | Treese et al. |
| 2003/0182151 A1 | 9/2003 | Taslitz |
| 2003/0208557 A1 | 11/2003 | Higbee |
| 2003/0225688 A1 | 12/2003 | Dobbins |
| 2003/0233418 A1 | 12/2003 | Goldman |
| 2004/0111619 A1 | 6/2004 | Laurie et al. |

FOREIGN PATENT DOCUMENTS

| | | |
|---|---|---|
| WO | WO0019296 | 4/2000 |
| WO | WO0019315 | 4/2000 |
| WO | WO0049521 | 8/2000 |
| WO | WO0062140 | 10/2000 |
| WO | WO0127832 | 4/2001 |
| WO | WO0201479 | 1/2002 |
| WO | WO0203174 | 1/2002 |
| WO | WO0203774 | 1/2002 |
| WO | WO0221383 | 3/2002 |
| WO | WO0237367 | 5/2002 |
| WO | WO0237386 | 5/2002 |
| WO | WO02063431 | 8/2002 |
| WO | WO02075575 | 9/2002 |
| WO | WO02075615 | 9/2002 |
| WO | WO02075616 | 9/2002 |
| WO | WO02075617 | 9/2002 |
| WO | WO02075618 | 9/2002 |
| WO | WO03077130 | 9/2003 |

OTHER PUBLICATIONS

Chris De Reza, Entire home sale process goes online, Jul. 31, 2000, Real Estate Finance Today, vol. 17, Iss. 29, p. 7.*

"Smart Document Specification—RC6.6", Mortage Bankers Association of America, Inc., Sep. 19, 2002, pp. 1-87.

"Guidelines for Document Custodians", Fannie Mae, Sep. 9, 1999.

* cited by examiner

```
┌─────────────────────────────────────────────────┐
│ eQC Status                                      │
│ ┌─────┐                                         │
│ │▓▓▓▓▓│~302                                     │
│ └─────┘                                         │
│ ┌─────────────────────────────────┐             │
│ │Checking for previous versions of data...│─304 │
│ │Validating data...               │─306         │
│ │Checking for closing agent data...│─314        │
│ │Checking for third party services data...│─316 │
│ │Creating documents...            │─318         │
│ └─────────────────────────────────┘     ─310    │
│ Check complete. There were NO issues found with the data.│
│ ┌──────────────────┐                            │
│ │ View eQC Results │─312                        │
│ └──────────────────┘                            │
└─────────────────────────────────────────────────┘
```

FIG. 3B  *300b*

```
┌─────────────────────────────────────────────────┐
│ eQC Results                                     │
│                                          ─402   │
│ ┌─────────────────────────────────────────────┐ │
│ │ Lender Data Results                         │ │
│ ├──────────────────────┬──────────────────────┤ │
│ │ Check Performed      │ Issue                │ │
│ ├──────────────────────┼──────────────────────┤ │
│ │ Balloon Term must not be │ Balloon Term is less than 5 years- │
│ │ less than 5 years.   │ resolve issue.       │ │
│ ├──────────────────────┼──────────────────────┤ │
│ │ Sum of HOEPA fees must│ HOEPA fees exceed 8% of "Net Loan" │
│ │ not exceed 8% of the "Net│ amount.- resolve issue │
│ │ Loan" amount received by│                     │ │
│ │ Borrower.            │                      │ │
│ └──────────────────────┴──────────────────────┘ │
│                                          ─404   │
│ ┌─────────────────────────────────────────────┐ │
│ │ Additional Checks to be performed           │ │
│ │ Below are additional checks that need to be performed on this loan.│
│ ├────────┬────────────────────────────────────┤ │
│ │ Status │ Check Performed                    │ │
│ ├────────┼────────────────────────────────────┤ │
│ │ ☐      │ Check 1                            │ │
│ ├────────┼────────────────────────────────────┤ │
│ │ ☐      │ Check 2                            │ │
│ ├────────┼────────────────────────────────────┤ │
│ │ ☐      │ Check 3                            │ │
│ └────────┴────────────────────────────────────┘ │
│                                                 │
│ ┌──────┐ ┌─────┐ ┌──────┐                       │
│ │Print │ │Save │ │Email │                       │
│ └──────┘ └─────┘ └──────┘                       │
└─────────────────────────────────────────────────┘
```

FIG. 4A  *400a*

| eQC Results | |
|---|---|
| Closing Agent Data Results (406) | |
| Check Performed | Issue |
| Is the loan amount on the HUD 1 the same as the application? | Closing Agent loan amount= 145,000.00<br>Lender loan amount= 150,000.00 |
| Is the borrower name on the HUD 1 the same as the application? | HUD 1 Name= John Homeowner<br>Application= James Homeowner |

| Third Party Services Data Results (408) | |
|---|---|
| Check Performed | Issue |
| Is the date on the appraisal less than 180 days old? | Today's Date= 12/02/03<br>Appraisal Date= 04/05/03 |
| Is the property type on the appraisal the same as on the application? | Appraisal property type= Detached<br>Application property type= Condominium |

Additional Checks to be performed (410)
Below are additional checks that need to be performed on this loan.

| Status | Check Performed |
|---|---|
| ☐ | Check 1 |
| ☐ | Check 2 |
| ☐ | Check 3 |

[ Perform eQC Check Again ] ~236

[Print] [Save] [Email]

Closing Services Platform
Order Info: Homeowner, John K.                ☐ Show Order Info   << Return to All Orders List   >>Advanced Search

| Order Information 504 | Documents 506 | eSigning 508 | History 510 |

Summary 512a

Order Identifiers
Casefile ID:        123456789
Closing File ID:
Lender Loan #:      4379812

Order Information
Order Status:       4379812
Scheduled
Closing Date:
Order Opened
Date/Time:          03/03/2003, 08:00:33 EDT
Loan Amount:        124,000
Loan Purpose:       Refinance
eSign:              Yes

514

Borrowers 512b

Property Address
Street Address 1:   1234 Main St.
Street Address 2:
City:               Fairfax
State/Zip+4:        VA/22033-9963
County:             Fairfax
Property Legal
Description:        Lot 44, Book 23, Page 44

Primary Participants
Borrower 1:         Homeowner, John K.
Phone:              111-111-1111

Lender & Closing Agent 512c

Lender Information – Edit
Company Name:       ABC Lender
Contact Person:     John Lender
Company Phone:      111-111-1111
Company Fax:        111-111-1111

Closing Agent Information – Edit
Company Name:       XYZ Closing
Contact Person:     Joan Closer
Company Phone:      111-111-1111
Company Fax:        111-111-1111

Comments 512d

⬆ back to top close window

Closing Services Platform
Order Info: Homeowner, John K.

☐ Show Order Info   << Return to All Orders List   >>Advanced Search

| Order Information *504* | Documents *506* | eSigning *508* | History *510* |

To print, save, email, rename, or remove documents, each document must be first selected using the checkbox directly to the left of the document name. Once the document(s) are selected click the appropriate button for the task. The "Print/Save" button launches Adobe Acrobat Reader to view, print, and save the selected documents.

[Upload Documents] — *516*

| Check All | Document Name | Date Added | Added By | eSign Status | Status Change Date | Status Changed By |
|---|---|---|---|---|---|---|
| ☐ | Deed of Trust | 08/01/2003 | J. Lender | --- | --- | --- |
| ☐ | GFE | 08/01/2003 | J. Lender | --- | --- | --- |
| ☐ | URLA | 08/01/2003 | J. Lender | --- | --- | --- |
| ☐ | Title Binder | 08/01/2003 | J. Closer | --- | --- | --- |
| ☐ | 30 YR Fixed Rate Note for VA | 08/01/2003 | J. Lender | --- | --- | --- |

} *526*

[Print/Save Selected Documents] *518*
[Email Selected Documents] *520*
[Remove Selected Documents] *524*
[Rename Selected Documents] *522*

[close window]

Closing Services Platform
Order Info: Homeowner, John K.

>>Advanced Search
<< Return to All Orders List

| Order Information 504 | Documents 506 | eSigning 508 | History 510 |

☐ Show Order Info eSigners
Borrowers
Borrower 1: John Kline Homeowner
Borrower 2: Mary Jane Homeowner

Others
Notary1: Nick Notary
Witness/Other 1: TBD
Witness/Other 2: TBD

[Begin eSigning]

Set eSigners
The documents below are listed in the order in which they will be signed. You can change that order by clicking on the "Doc Signing Sequence" button the left sidebar.

| Document Name | Borrower 1 | Borrower 2 | Notary 1 | Notary 2 | Witness/Other 1 | Witness/Other 2 | File Only |
|---|---|---|---|---|---|---|---|
| HUD-1 | ☐ | ☐ | ☐ | ☐ | ☐ | ☐ | ☒ |
| Deed of Trust | ☐ | ☐ | ☐ | ☐ | ☐ | ☐ | ☐ |
| GFE | ☐ | ☐ | ☐ | ☐ | ☐ | ☐ | ☐ |
| URLA | ☐ | ☐ | ☐ | ☐ | ☐ | ☐ | ☐ |
| Title Binder | ☒ | ☐ | ☐ | ☐ | ☐ | ☐ | ☐ |
| 30 YR Fixed Rate Note for VA | ☒ | ☐ | ☐ | ☐ | ☐ | ☐ | ☐ |

[Save]  [Save]  [Next >>]

Sidebar:
- 502 — (top bar)
- 532 Set Signers
- 534 Modify Signatures
- 536 Doc Signing Sequence
- 538 (eSigners bracket)
- 540 (documents bracket)

Closing Services Platform
Welcome to eSigning

You are about to lead the signers through the eSigning process. Make sure the default signatures have accurately been set for each required signer. Prepare the signers to read the Consumer Agreement and click the "Begin eSigning" button to start the process.

The following individuals have been identified as signers:

| Name | Default Signature | Role |
|---|---|---|
| John Kline Homeowner | John Kline Homeowner | Borrower 1 |
| Mary Jane Homeowner | Mary Jane Homeowner | Borrower 2 |

604

For the signer's convenience, some or all of the following documents may be signed at the same time by the application of a single signature as set out in the following screens per your lender's instructions. Note, however, that the signature will be applied to and effective on each document as if each document was signed individually. Please select which documents should be signed in this manner.

If the signers would rather sign each document individually, do not check the checkboxes below, and click the "Begin eSigning" button.

| Check All | Document Name |
|---|---|
| ☐ | Consumer Agreement: Borrower 1 |
| ☐ | Consumer Agreement: Borrower 2 |
| ☐ | 30 YR Fixer Rate Note for VA |
| ☐ | HUD-1 |
| ☐ | Deed of Trust |

606

608 — [ Begin eSigning ]
610 — [ Exit eSigning ]

[ << Previous ]   [ Next >> ]

Closing Services Platform
Select Loans for Delivery

700

704 — View Delivery Details

| Check All | Closing Date | Lender Loan # | Primary Borrower's Last Name | Property Street Address | Loan Amount | Interest Rate | Casefile ID | Order Status |
|---|---|---|---|---|---|---|---|---|
| ☐ | 09/21/2003 | 4379812 | Homeowner | 1234 Main St., | 124,000 | 5.525 | 123456789 | eSigned |
| ☐ | 09/21/2003 | 1234567 | Homeseeker | 42795 Freedom St. | 250,000 | 6.750 | 987654321 | eSigned |
| ☐ | 09/10/2003 | 4379812 | Smalls | 2258 Hogsford Rd. | 500,000 | 5.525 | 123456887 | eSigned |
| ☐ | 09/10/2003 | 4379845 | Alvarez | 454 Wisconsin Ave., Suite 4140 C | 350,000 | 7.375 | 123456325 | eSigned |
| ☐ | 09/08/2003 | 4379834 | Grooms | 225 Shilo Ave. | 250,000 | 5.525 | 123456361 | eSigned |
| ☐ | 09/08/2003 | 4379833 | Buck | 4605 Brookfield, Corporate Dr, Suite 4140 C | 1,250,000 | 8.500 | 123456114 | eSigned |
| ☐ | 09/08/2003 | 4379898 | Price | 5613 Stone Rd | 560,000 | 6.550 | 123456336 | eSigned |
| ☐ | 09/05/2003 | 4379800 | Swindol | 12735 Shoppes Ln | 333,000 | 6.500 | 123456778 | eSigned |
| ☐ | 09/05/2003 | 4379822 | Wilson | 14200 Centreville Sq | 240,000 | 5.750 | 123456665 | Delivery Rejected |
| ☐ | 09/05/2003 | 4379838 | Byrd | 14001 Metrotech Dr | 565,000 | 7.500 | 123456000 | eSigned |
| ☐ | 09/03/2003 | 4379809 | Gomez | 2575 John Milton Dr | 780,000 | 5.525 | 123456996 | eSigned |
| ☐ | 09/03/2003 | 4379865 | Reynolds | 14125 Saint Germain Dr | 600,000 | 5.000 | 123456789 | eSigned |
| ☐ | 09/03/2003 | 4379866 | Unnahchock | 13900 Lee Jackson, Memorial Hwy | 125,000 | 6.375 | 123456336 | eSigned |
| ☐ | 09/03/2003 | 4379877 | Barrett | 4501 Daly Dr #100 | 450,000 | 6.550 | 123456778 | eSigned |
| ☐ | 09/03/2003 | 4379855 | Monroe | 5740 Union Mill Rd | 333,600 | 5.375 | 123456112 | eSigned |
| ☐ | 09/01/2003 | 4379887 | Wilson | 13360 Franklin Farm Rd | 800,000 | 8.500 | 123456669 | eSigned |
| ☐ | 09/01/2003 | 4379832 | Shah | 6335 Multiplex Dr | 950,000 | 5.525 | 123456225 | eSigned |
| ☐ | 09/01/2003 | 4379815 | Manfield | 14201 Sullyfield Cir | 650,000 | 6.000 | 123456568 | eSigned |
| ☐ | 09/01/2003 | 4379814 | Kapoyos | 1228 Elden St | 380,000 | 6.500 | 123456734 | eSigned |

Continue    Continue

ELECTRONIC CLOSING

CROSS REFERENCE TO RELATED APPLICATIONS

This application claims the benefit under 35 U.S.C. 119(e) of provisional application 60/431,847, filed Dec. 9, 2002, now abandoned, entitled "Electronic Closing" the entire contents of which are hereby incorporated by reference.

BACKGROUND OF THE INVENTION

1. Field of the Invention

This invention relates generally to transaction closings and more particularly to an electronic closing platform for real estate closings.

2. Description of the Related Art

Borrowers often use lenders to finance real estate transactions in the primary mortgage market. A mortgage loan closing may involve a property sale, or a refinancing of an owned property. Where there is a property sale, a typical closing can involve a buyer, seller, lender. The lender loans funds to the buyer, and disburses them to the seller to complete the transaction. The buyer signs a promissory note (also referred to as a mortgage note) that obligates the buyer to repay the loaned funds. The buyer is thus often referred to as the borrower in the mortgage loan closing transaction. The closing will typically be performed by a closing agent.

One problem with existing closings is that there can be errors in the closing documents. Another problem is that each party (e.g., lender, closing agent) may have their own computer system for entering and managing data that corresponds to documents used at the closing. There are often discrepancies between the data belonging to the various parties, or discrepancies between a party's data and the closing documents, which need to be corrected or otherwise remedied after a closing takes place.

In addition to the involvement of a lender and closing agent, other parties may also be involved, including but not limited to those performing an appraisal, providing title insurance, providing flood insurance, providing mortgage insurance, and underwriting the loan. These parties also contribute information that is relevant to the closing and may even be used in the closing documents. This furthers the opportunity for errors and discrepancies between and among parties' data, as well as the closing documents.

Other parties may further complicate matters. Lenders sell mortgages to investors in what is known as the secondary mortgage market. Examples of investors include government sponsored entities (GSEs) such as Fannie Mae, Freddie Mac, and Ginnie Mae. Investors also include commercial banks, community banks, savings and loan associations, and others. Some of these entities participate as both lenders and investors at various times. That is, they both sell and purchase portfolios of mortgages. In any event, these investors may make investments in mortgages conditional on particular requirements. For various reasons, closing participants want to meet these particular requirements so that their loans are marketable on the secondary market.

Electronic documents are being introduced for mortgage transactions. Use of these documents can be beneficial to participants in such markets because they can reduce the amount of physical error checking that is often required for paper documents, as well as the number of opportunities for creating discrepancies and errors among and between the various forms used by different participants. However, even where a lender uses electronic documents, a typical closing will still often implement traditional paper based practices, wherein borrowers sign standard paper forms using pen and ink (also referred to as "wet" signing in the industry). Furthermore, there is a disincentive to using electronic documents where other parties in the closing transaction will not be relying upon the electronic document (e.g. closing agent, borrower).

Still another problem with electronic documents is that there are various different systems to which a document will need to integrate. Even where all of the parties to a transaction, and parties to related transactions use the same electronic document format, there are still often discrepancies among and between the variously defined documents.

What is needed is a system for accommodating closing transactions that allows participants to avoid the above described problems and encourages and accommodates the sharing of data, and ensures the accuracy of data used for the closing.

SUMMARY OF THE INVENTION

The present invention provides an electronic closing platform and related systems and processes. The electronic closing platform facilitates provision of a variety of closing services for lenders, closing agents, borrowers or other parties to closing transactions. Electronic quality control procedures are invoked for closing data and documents whether they are in electronic or paper form. The platform is independently accessible and therefore accommodates data sharing between mortgage industry participants. The data used by a party or the closing data may be checked for accuracy and consistency among systems at various stages before, during and after the closing.

Electronic signature capabilities, including a batch signing functionality, and tamper evident sealing after signing accommodate improved processing and system integrity. Additional features include registry filing, an electronic vault for storing electronic documents, and electronic recording.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 2 is display diagram illustrating a lender screen for interfacing with an electronic closing platform in accordance with the present invention.

FIGS. 3A-B are display diagrams illustrating electronic quality control request screens provided by an electronic closing platform in accordance with the present invention.

FIGS. 4A-B are display diagrams illustrating electronic quality control status screens provided by an electronic closing platform in accordance with the present invention.

FIGS. 5A-C are display diagrams illustrating closing information conveyed by an electronic closing platform in accordance with the present invention.

FIG. 6 is a display diagram illustrating electronic signing pursuant to an electronic closing in accordance with the present invention.

FIG. 7 is a display diagram illustrating electronic loan delivery provided by an electronic closing platform in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
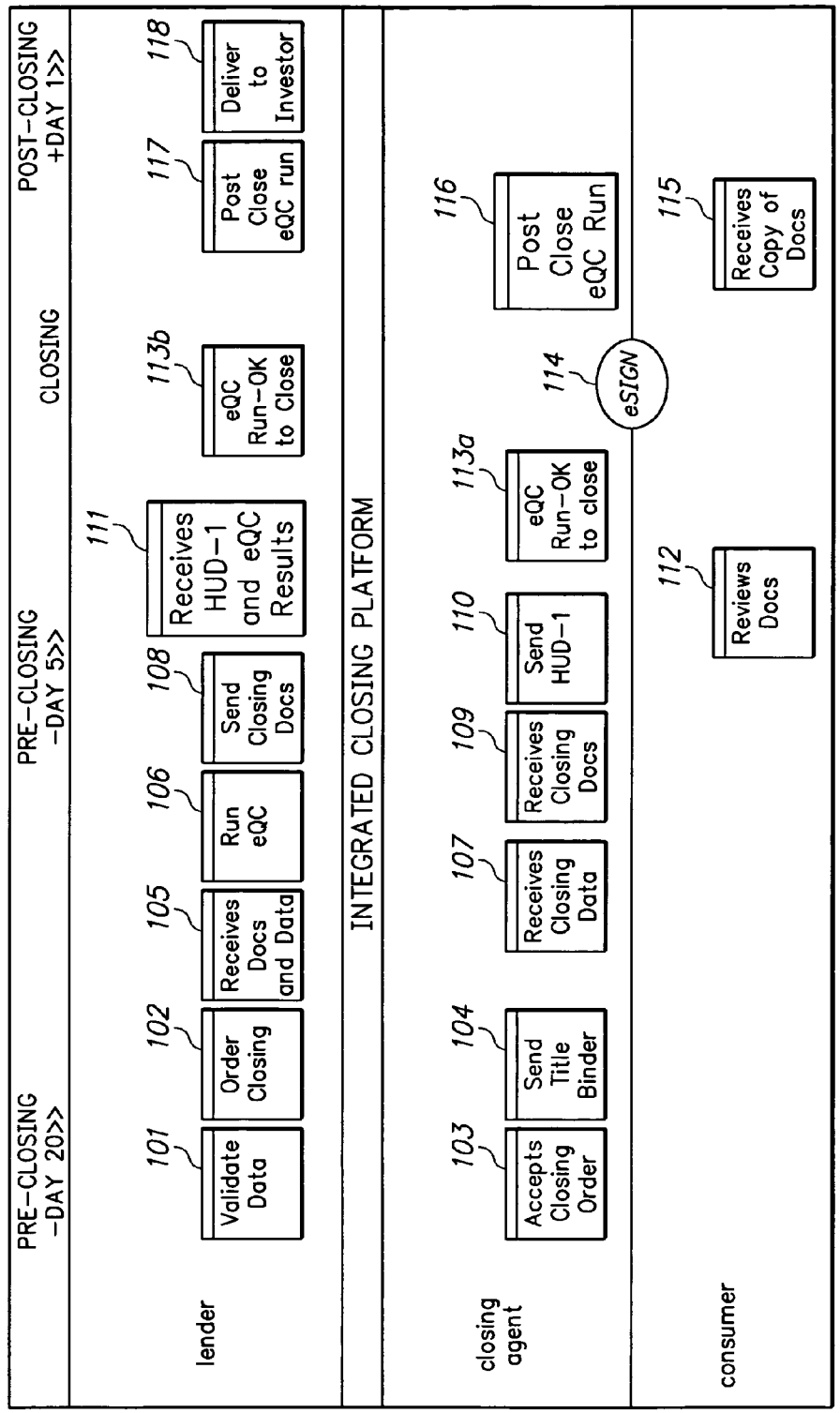
FIG. 1 is a flow diagram illustrating an embodiment of electronic closing in accordance with the present invention.

FIG. 1 is a flow diagram illustrating an electronic closing process 100 facilitated by an electronic closing platform (ECP) in accordance with the present invention. Although fewer or more participants may be involved, the illustrated process 100 involves a Lender, Closing Agent, and Borrower, with respective rows corresponding to each participant. The ECP could also be provided by a separate party. The ECP facilitates provision of a variety of closing services for Lenders, Closing Agents, Borrowers or other parties to closing transactions. Electronic quality control procedures are invoked for closing data and documents whether they are in electronic or paper form. The ECP manages data corresponding to a given closing, allows parties to compare data from their systems to data established for the given closing to ensure that their data is consistent with the data to be used at the given closing, and also allows parties to make use of data previously established for the given closing, which further accommodates data consistency and also avoids re-keying of data related to the given closing.

Prior to describing the process 100 in more detail, an example of a lender system and electronic mortgage document are now provided for context. Lenders have various systems for generating loan packages. Many Lenders implement what is referred to as a Loan Originating System (LOS). Lenders may also originate a mortgage and create the necessary documents in conjunction with a service provider's electronic mortgage system, such as the MORNETPlus® 2000 system, which implements Desktop Underwriter®, Desktop Originator®, and MORNETPlus Connections, all provided by Fannie Mae. In particular, the Desktop Underwriter® works with various conventional LOS systems to allow lenders to originate mortgages and create documents such as loan applications. Other pertinent documents can also be created by independently using an LOS, or through MORNETPlus Connections. There are various alternatives, including but not limited to those working with the Freddie Mac Loan Prospector®, third party document preparation software, and others. Although it may also exist independently, the ECP may be provided in conjunction with such electronic mortgage systems.

Preparation of a loan package results in the creation of an electronic mortgage data set ("EMD"). The EMD may be variously embodied. For example, the EMD may be a lender dataset that is applicable to the loan package, and is used to create corresponding documents. Another example of an EMD is a closing agent dataset that is used pursuant to the closing agent's participation in the closing. An EMD may also be provided as an Extensible Markup Language (XML) based file containing previously defined elements and attributes, and corresponding values. In another alternative, an EMD may be a formal electronic mortgage document. In either case, the actual closing may be one that uses traditional pen and ink signing of paper documents, or electronic signing of an EMD (e.g., electronic signing of formal electronic document or dataset corresponding to closing transaction). Although aspects of the present invention are applicable to any data set, an example of a format for a formal electronic mortgage document is described further below. Additionally, regardless of how it is embodied, the EMD may later be represented in paper form where the EMD is used to create paper documents, if applicable.

Figure 10:
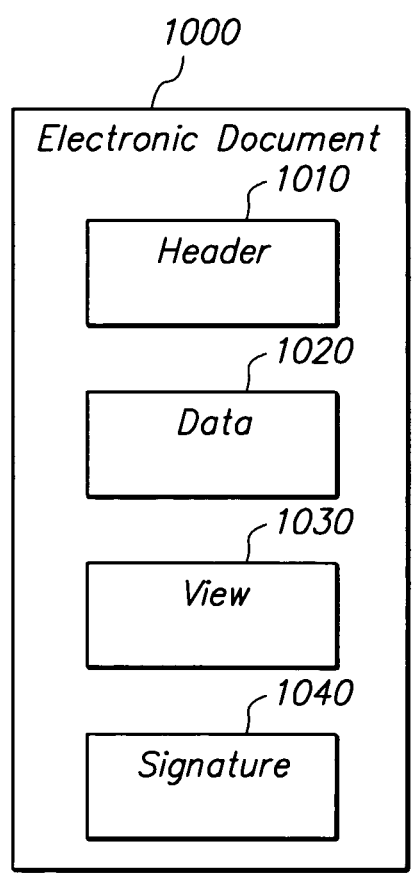
FIG. 10 is a block diagram illustrating an electronic mortgage document.

FIG. 10 illustrates an example of a formal electronic document 1000. The electronic document 1000 includes a header section 1010, a data section 1020, a view section 1030, and a signature section 1040. The header section 1010 contains information about the document itself, such as its version, the type of document (promissory note, trial transcript, etc.) and whether or not all parties have signed. The data section 1020 contains the information corresponding to that originating from an equivalent paper document, such as data from a promissory note. It may also contain some non-viewable information pertaining to transactions. The view section 1030 contains tags that describe how to format and present the data contained in the document. Links may connect the unformatted information in the data section 120 to the corresponding formatted information in the view section 130. The header 110 and data 120 sections are preferably written in extensible markup language (XML) and the view section 130 is preferably written in extensible hypertext markup language (XHTML), which are conventional languages for creating electronic documents, although various alternative languages may be utilized.

The signature section 1040 provides the electronic signatures for the electronic document. The signature section 1040 may include one or more of the following: (1) the signers of the document, their roles and order of signing the electronic document 1000; (2) for unsigned documents, signature templates that indicate where signatures are to be applied in the document, the relationship between the signer and the placeholder and how the components of a signature are presented to the signer; (3) for signed documents, a representation of the signature in either digital or electronic form and its relationship to the signer; and (4) for documents with a tamper seal, an XML digital signature verifying the content of the electronic document 1000 represented in an XML digital signature. The tamper seal may also be referred to as a tamper evident seal, as it later can provide evidence whether the digital content had been altered. Some signatures may also reside in the view area. All of the signature features may also be provided outside the boundaries of the electronic document.

The sections 1010, 1020, 1030, 1040 are variously optional depending upon the circumstances and usage of the electronic document 1000. For example, it might be desirable to strip one or more of header 1010, data 1020, view 1030 and signature 1040 sections from the electronic document 100 to facilitate processing, display or transmission. Likewise, an electronic document that is only intended for viewing may not contain a data 1020 section (e.g., a billing statement emailed to a client). It also may be desirable to replace the view 1030 section with viewable electronic documents in alternative formats such as a PDF or an image file. A formal electronic mortgage document is described further in commonly assigned application Ser. No. 10/321,823, entitled "Electronic Document for Mortgage Transactions" and filed on Dec. 17, 2002 by J. Harvey Trimble, Jr. et al., the contents of which are hereby incorporated by reference.

Again, the electronic document 1000 is described only by way of an example, and other EMDs that differ from the described electronic document 1000 are equally applicable to the electronic closing functionality of the present invention.

Referring again to the flow diagram of FIG. 1, the electronic closing process 100 initiates with the Lender requesting data validation 101 prior to placing an order for closing services, which ensures consistency of lender data. Such validation can be provided by an electronic quality control functionality that is provided by the ECP or by the Lender locally. The validation may be performed using conventional validation techniques dependant upon the type of data that is involved, such as validation of an Extensible Markup Language (XML) document based upon a previously defined document type definition (DTD). Validation may also be supplemented with additional validation procedures outside the domain of typical validation, such as checking particular values to ensure that they are consistent with expectations for the given application or that data is consistently presented within and among documents. The validation ("EQC") processes provided by the ECP are described in more detail below.

Figures 2, 3A:
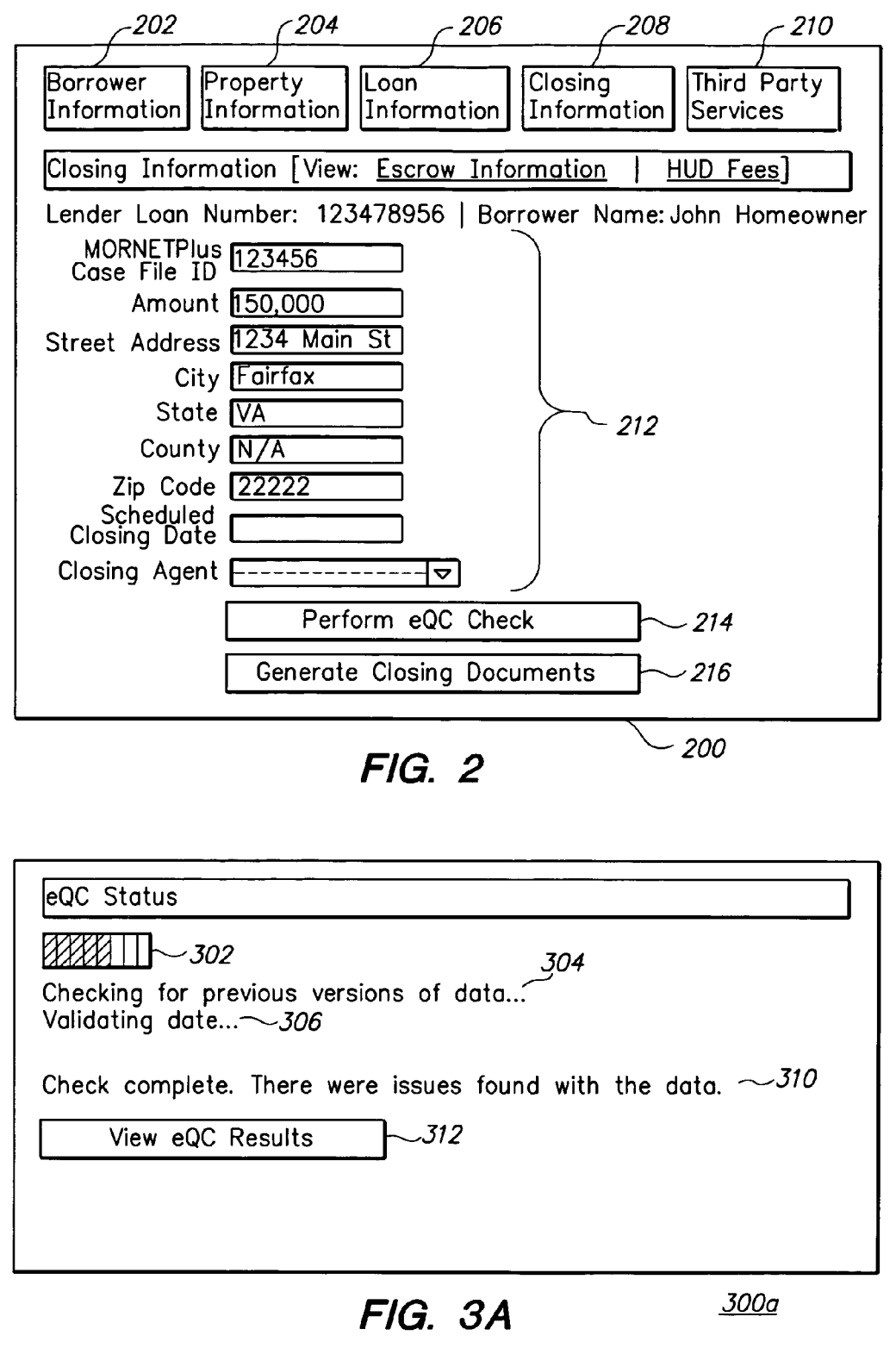

The display diagram of FIG. 2 illustrates an example of a Lender loan origination system interface 200 for interfacing with the ECP. The interface 200 includes a variety of tabs in a header area, which respectively allow navigation to borrower information 202, property information 204, loan information 206, closing information 208, and third party services 210 information that is displayed in the main portion of the interface 200. Selection of the borrower information 204, property information 204, and loan information 206 tabs respectively prompt display of detailed information about the borrower(s), the subject property, and the corresponding loan for a particular closing. The third party services tab 210 prompts display of buttons or the like that allow the selection of various third party services, including but not limited to ordering a credit report, underwriting the loan, obtaining flood insurance, ordering mortgage insurance, and ordering closing services.

In the illustrated state, the closing information tab 208 is selected, which prompts a variety of loan identification information 212 to be displayed along with buttons respectively entitled Perform EQC Check 214 and Generate Closing Documents 216. The loan identification information 212 includes basic identification information such as the amount and property identification information. It may also include a closing date field as well as an identification of the closing agent. A case file ID number corresponds to the number used by the closing services platform to track the particular loan. Common usage of the case file ID allows the ECP to manage datasets and corresponding requests of various different parties.

Referring to FIG. 1 along with FIG. 2, if the Lender invokes the quality control services provided in conjunction with the ECP, pressing the Perform EQC Check button 214 prompts processing accordingly. Generally, the EQC Check functionality receives and examines the Lender data, compares it to previously determined data for the closing (if applicable), and applies rules that determine the sufficiency of the data. The EQC process confirms that data is consistent and accurate within and among datasets, and that the corresponding aspects are sufficient for the given transaction, preferably according to rules that are applied to the data. The EQC process is described further below. Following validation 101, the Lender may order 102 closing services which can be accepted 103 by the Closing Agent, all through the ECP. As part of an "Open Order" process, the Lender identifies the services to be performed by the Closing Agent, such as electronic quality control or electronic signing. A corresponding display (not illustrated) allows the Lender to place, review, and update orders, and to perform other operations such as uploading documents pursuant to the closing, and displays closing order details, such as an identification of the closing company and the type of electronic signature process to be employed.

The acceptance 103 by the Closing Agent may be similarly conducted through the ECP. In one embodiment, notice regarding the order placement is provided by an e-mail from the ECP to a particular Closing Agent. The e-mail would be sent automatically whenever a Lender would place an order naming the particular Closing Agent. The e-mail contains information identifying the Lender, the loan and corresponding requested services. It would also preferably include the casefile ID number, particularly where the Closing Agent also integrates with the ECP. Finally, the e-mail may also include a hyperlink that allows navigation to the ECP, and population of an appropriate form with the casefile ID number, for easy presentation of the relevant information to the Closing Agent.

Upon completion of the title curative process, the Closing Agent may then send 104 the title binder to the Lender for receipt 105 by the Lender. Where both parties are integrated with the ECP, receipt by the Lender may be in the form of retrieving the information from the Platform. This may be accommodated through a user interface that identifies and presents the current documents available for the closing along with status information and a variety of buttons used to take various related actions. The identification and status information preferably includes the document name, date added, entity adding the document, status change information, and an indication of whether the document has been electronically signed. The related actions include uploading, printing, e-mailing, renaming, and removing, and may be applied to any or all of the listed documents. This user interface is described further below in connection with a later stage in the closing process, with reference to FIG. 5B.

At this stage, if pertinent data has changed, the Lender may also place an "Update Order" request, which is similar to the previously described "Place Order" request and thus prompts an e-mail or other notification to the Closing Agent informing that entity of the status of the closing and related documents. Also in similar fashion, if the Closing Agent is integrated to the ECP, it will automatically populate the Closing Agent system. There may be multiple instances of an update order request as the documents are created and modified during pursuant to a closing.

For purposes of discussion, it is presumed that the Lender is preparing to provide the closing documents to the Closing Agent as part of the Update Order request. Pursuant to the request, the Lender will be prompted to run 106 an EQC check against the current set of documents and corresponding datasets. Preferably, anytime an order is placed or updated, the appropriate user will be prompted to run such a check to ensure data integrity. The EQC process is described further below. Once this is done, the closing agent can receive 107 the closing data. This avoids having the Closing Agent re-key the same data into their system, and ensures accuracy in the closing documents prepared by the closing agent.

The Lender also sends 108 the closing documents through the ECP. Again, an EQC request can be used to validate the documents prior to uploading the documents to the platform to ensure consistency and accuracy of the data. The Closing Agent similarly receives 109 the documents through the platform. Receipt 109 of the documents can be accommodated through user interfaces provided through the ECP, which are described further below with reference to FIGS. 5A-C. At this stage, the Closing Agent prepares and sends 110 the HUD-1 document to the Lender through the ECP, again using an EQC request to ensure detection and correction of any deficiencies. The Lender receives 111 notification of the posting of the HUD-1 and corresponding EQC results. Again, consistent and accurate data are ensured, and the Lender may receive the validated data directly particularly where both the Lender and the Closing Agent are integrated with the platform.

At this point, the Borrower may also review 112 the closing documents. An invitation for such review may be provided by an e-mail sent by the ECP on behalf of the Closing Agent, either containing representations of the documents or instructing the Borrower how to navigate to the closing documents. The latter would ensure that the Borrower was reviewing the same document as would be used for the actual closing. According to another aspect of the present invention, the Borrower is provided with a concise (e.g., one page) consumer summary that summarizes the key terms of the deal (e.g., name, loan amount, payment type), which allows a review of easily understandable information by the consumer before the closing.

Prior to the actual closing, the Closing Agent and Lender may respectively run quality control checks 113a, 113b again. This allows the Closing Agent and Lender data corresponding to the documents published for closing to be compared, again ensuring consistency and accuracy of the data, and further ensures that there have not been any last minute changes that might have caused a discrepancy.

The EQC process is now further described with reference to examples of display diagrams for providing the status of an EQC check and corresponding results reports. As described, the EQC process offers business predictability to participants by confirming that data underlying examined documents is consistent, accurate and sufficient for the given transaction, such as the described closing. In addition to the immediate needs of the closing, the EQC process may also address related requirements such as ensuring that the loan will be sufficient for a sale by the Lender to an investor in the secondary mortgage market after the closing.

A first optional portion of the EQC process is a general validation of the document. This portion of the process is most applicable where a formal electronic mortgage document is involved. One example of such validation operates in conjunction with electronic documents having view and main data sections. To validate the electronic document, a set of validation rules is retrieved and applied to the electronic document. The validation rules include comparison rules for determining whether a display provided by the view portion substantially matches the main data portion. In one embodiment, substantial matching is verified for a set of values for fields required to validate a particular transaction. The comparison rules allow a determination whether certain values contained in the main data portion substantially match those found in the view portion of the electronic document. The validation rules can also include identifier reference rules and membership rules. The identifier reference rules determine whether a value is proper for a given field, in accordance with the type of document being validated. The membership rules determine whether the electronic document includes fields required for electronic documents in a particular environment. Application of the comparison, identifier reference, and membership rules in combination facilitates a validation of an electronic document that verifies that the document includes all necessary parameters for a particular transaction, that the values for the parameters meet expectations, and that the parsed data contained in the document substantially matches the document (or other view) used by parties to a transaction involving the electronic document. An example of document validation is further described in application Ser. No. 10/339, 775, entitled "Electronic Document Validation" and filed on Jan. 9, 2003 by Michael Daconta et al., which issued on Nov. 20, 2007, as U.S. Pat. No. 7,299,408, the contents of which are hereby incorporated, by reference.

In addition to the above, the EQC process preferably implements rules that are used to determine whether electronic data corresponding to an examined document (e.g., note) is accurate and includes the necessary elements to support the related transaction (e.g., closing). The rules provided by the EQC system can be thought of as falling within multiple categories. The first can be referred to as a "core set" that is required to generally support a given transaction. For example, industry standards that govern the sale of loans from any lender to any investor in the secondary mortgage market dictate the constitution of a core set of rules for that type of transaction. The additional categories are respectively party driven. For example, a particular investor may contribute rules beyond the industry standard, and a particular lender may have an even more stringent review process than the investor, and thus desire still further rules. The EQC system is arranged to variously accommodate rule contributions. For example, the EQC system may include the core set of rules by default, and include mechanisms for allowing participants to submit additional rules.

The rules also allow the generation of reports that are tailored to potential problems with electronic mortgage documents. This allows the lender to correct errors or omissions, and thus modify the electronic mortgage document so that it will be known to be marketable. Although one embodiment of this process applies to closings with further support for resale on the secondary mortgage market, it is also applicable to transactions.

An EQC request can be sent along with a corresponding EMD to the EQC system, which retrieves the appropriate rules, applies them to the EMD, and returns corresponding results. An example of an EQC system and corresponding process is further described in commonly assigned application Ser. No. 10/405,890, entitled "Electronic Mortgage Quality Control" and filed on Apr. 1, 2003 by Charlotte Haberaecket et al., currently pending, the contents of which are hereby incorporated by reference.

FIGS. 3A-B are display diagrams illustrating EQC status request screens 300a-b, and FIGS. 4A-B are display diagrams illustrating EQC results screens 400a-b. The EQC Status screen 300a corresponds to an EQC request made early in the closing process, such as prior to the Lender submitting an order to the Closing Agent. A status bar 302 progressively highlights the progress of processing the EQC request, by indicating a color change that progresses from left to right. Below the status bar, various milestones 304, 306 in the EQC process are progressively highlighted as they occur. Here, checking for previous versions of data and validating data are shown. A summary announcement section 310 indicates the results of the EQC request. Here, an indication of "Check complete. There were issues found with the data" is shown. The user may then click on the "View EQC Results" button 312 to prompt a display of the identified issues. Examples of such results are found in the EQC results screens 400a-b. Note that the first EQC results screen 400a (FIG. 4A) corresponds to an EQC request made by the lender prior to the order placement, and the other EQC results screen 400b (FIG.

4B) corresponds to a later closing stage after receipt of data from other parties. These screens are provided by way of example and it should be understood that EQC results can be variously reported to the parties. The first EQC Results screen 400a illustrates Lender Data Results 402 in a first section and Additional Checks to be Performed 404 in a second section. The Lender Data Results 402 section indicates problems found with the data pursuant to the EQC request. Here, a column indicates the type of check performed, and the corresponding identified issue. For example, an EQC rule may require the term of a balloon loan to be less than five years. If a loan is found to be a balloon type, and the field corresponding to the term in the underlying dataset is found to be less than five, this result and corresponding message are prompted. The Additional Checks to be Performed section 404 corresponds to checks that can be defined by the user on an ad hoc basis, going beyond what the closing platform provides in a default EQC check. For example, if a particular lender has a policy of not originating 15 year mortgages, but the ECP generally allows such transactions, then the particular lender may cause particular rules relating to this issue to be applied under the EQC process, to produce corresponding results. Namely, for that particular lender the EQC check and results would include a verification that the loan term is not 15 years.

Once issues with the data are identified, the issues can be variously resolved by the Lender. In a simple example, erroneous data can be corrected by linking to the relevant document and correcting the data. At times, there may be a need to require third party actions, such as where an appraisal is too dated to use for the closing. Regardless, upon resolution, the EQC check can be repeated to ensure that the new data is accurate, complete and adequate.

The EQC Results screen 400b of FIG. 4B illustrates examples of the kinds of issues that the EQC process detects in reviewing other parties' data. Particularly shown are sections for the Closing Agent 406 and Third Party Services 408, along with Additional Checks to be Performed 410. As illustrated in the Closing Agent 406 section, some EQC results may indicate discrepancies found between Lender and Closing Agent datasets (e.g., HUD-1 loan amount disagreeing with loan amount in application). Other EQC results may indicate similar inconsistencies between datasets (e.g., application property type differs from appraisal property type), or indicate problems related to other rules (e.g., date on the appraisal more than 180 days from the current date). Sometimes issues can be immediately resolved. The Perform EQC Check Again button 236 allows the user to immediately conduct another EQC request after data has been corrected, to see whether any issues remain. The EQC Status screen 300b of FIG. 3B illustrates a status report where no issues are found. It similarly includes a status bar 302 and corresponding milestones. Here, "checking for previous versions of data" 304, "Validating data" 306, "Checking for Closing Agent data" 314, and "Checking for third party services data" 316 are progressively highlighted as the request processing progresses. Optionally, documents can be automatically created (see 318) where no issues are found pursuant to the EQC request. The summary area 310 indicates "Check complete. There were NO issues found with the data."

Once there are no remaining issues, referring again to FIG. 1, the closing may take place. The closing may implement electronic signatures 114 managed by the ECP. The status of which documents are to be signed electronically may be managed throughout the preparation of the documents prior to the closing, wherein the Closing Agent (or others) may select parties (Borrowers, Notaries, Witnesses) and documents (Note, etc.) that will be signed, as well as the type of electronic signature to be provided.

FIGS. 5A-C are display diagrams illustrating closing information conveyed by a ECP. The ECP screen 500a illustrates the basic presentation. A header area 502 identifies the closing services platform and identification information for a subject order (variously identifiable, here by the homeowner name). Various tabs, entitled "order information" 504, "documents" 506, "eSigning" 508 and "History" accommodate navigation among the various information and services provided by the platform. In FIG. 5A, the "order information" 504 has been selected. Additional navigation within this section is available through 512a, Borrowers 512b, Lender & Closing Agent 512c, and Comments 512d buttons. Here, the Summary button 512a is selected, which prompts the main display 514 to show general summary information about the order, such as identifier information, property address information, brief lender and agent information, and the like.

When the Documents tab 506 is selected, a screen 500b showing document information appears (FIG. 5B). A listing 526 of the various documents being managed by the platform for the order is provided, along with status and other information as previously described. Check off boxes at the left hand column corresponding to each document accommodate selection of a document, and actions provided by various buttons may then be applied to such selected documents. Namely, these actions acre "Print/Save Selected Documents" 518, "E-Mail Selected Documents" 520, "Rename Selected Documents" 522, and "Remove Selected Documents" 524. Documents may also be uploaded to the platform by selection of the "Upload Documents" button 516, which prompts display of other screens to accommodate an uploading of the document from the Closing Agent (or other party) to the platform.

When the eSigning tab 508 is selected, a screen 500c showing information 538, 540 about electronic signatures to be applied to various selected documents. Additional navigation is provided by Set Signers 532, Modify Signatures 534, and Doc Signing Sequence 536 buttons. Here, the Set Signers button 532 has been selected, and thus identification information about the electronic signers is shown in one panel 538 and document identification and status information is shown in another panel 540 of the main display. The electronic signatures identifies the names of the parties who will sign (or have signed) certain documents electronically. Other signing parties such as notaries and witnesses may also be identified. The information about the signers may be changed through conventional panels by pressing the modify signatures button 534, which would prompt corresponding changes in a subsequently displayed electronic signers panel 538. The document identification and status information panel 540 identifies the documents managed by the platform and includes columns of check off boxes corresponding to each potential electronic signer. A check in the box corresponding to a particular document and particular signer indicates that the document will be signed electronically by that particular signer. Here, borrowers 1 and 2 will both sign the Note electronically. The sequence of signing the documents electronically may also be variously set by selecting the doc signing sequence button 536 and then providing appropriate input. A default sequence can be provided so that this operation does not necessarily need to be performed.

At the closing stage, the "Begin eSigning" button may be selected, which prompts display of screens that accommodate electronic signing, configured as previously described. FIG. 6 is a display diagram illustrating an introductory screen 600 for initiating electronic signing pursuant to an electronic closing. A header section 602 identifies the closing services platform and the eSigning section, and a main display includes a signer identification section 604 and a document identification section 606. The documents may be signed individually, or some or all of the documents may be concurrently signed through application of a single signature. Grouping documents for such a concurrent signature is accommodate through a check off box corresponding to each document to be signed.

Once the signers are satisfied with the arrangement of signing, selecting the Begin eSigning button 608 prompts navigation to interfaces that accommodate the electronic signing. Such electronic signing is conducted according to the underlying documents that will be signed. The signers may individually be presented with information that allows them to confirm that they understand the electronic signing process and may then be prompted to affirm their agreement to continue with electronic signing. The signers are then individually presented with graphical representations of the documents to be signed, such as the note. The Borrower is allowed to navigate through the document to review its contents, and then to an area wherein electronic signing will be affirmed. This area would preferably correspond to the area where a paper document would be signed using pen and ink. Selection of an appropriate button (e.g., "I Agree") completes the electronic signature. Subsequent viewing of the document will indicate that the document has been signed, such as by a statement "Electronically signed by John Kline Homeowner on DATE at TIME EDT."

The actual form of the electronic signature and the application of the same to the electronic document may be variously provided. In one embodiment, this may be a formal electronic mortgage document that includes a signature section as previously described. Various signatures, including digital and electronic signatures, may be used. For digital signatures, a signature element according to the W3C XML Signature specification can be used. For electronic signatures, the electronic document could include the following signature elements: SIG_IMAGE, SIG_TEXT, and SIG_OBJECT. The SIG_IMAGE element corresponds to a locally encoded image of the person's signature or a holographic signature. The SIG_TEXT element refers to a string of text inputted by the signer. If the SIG_TEXT element is within a viewable HTML view, the text will appear. Outside of the SIG_TEXT element an application is free to style the signed text with an enclosing SPAN tag. Lastly, a SIG_OBJECT element corresponds to any external object code to be presented as an electronic signature. This would correspond to an HTML embed tag for the specific purpose of presenting a captured signature (e.g., a form of a biometric signature).

The electronic document format is provided only by way of example, and the electronic signature could be variously applied to any type of document corresponding to the closing. Additionally, the present invention contemplates usage with traditional closings wherein paper documents are executed using pen and ink. There, completed closing signatures may be incorporated into electronic documents corresponding to the closing to effectively accommodate the electronic closing functionality. This can be done by entering information regarding the completion of the signature that is retained along with the electronic document (or other EMD), scanning the signed documents, or the like.

Tamper evident sealing may also be applied to the electronic mortgage document following the signature of the documents at closing. Specifically, a tamper evident seal can be applied in the form of a digital signature having as its target the portions or the entirety of the electronic document. The tamper evident seal wraps the contents, preferably including the applied electronic signature(s) of the borrower(s). As described further in the previously introduced application Ser. No. 10/321,823 ("Electronic Document for Mortgage Transactions"), the tamper seal can be performed using a standard PKI method, with hash and key value being included in relevant signature tags, and the digital signature value stored between opening and closing "SignatureValue" tags. The signature section may also store the digital certificate including the public key of the private-public key pair.

The present invention is not limited to the signing and tamper evident sealing features of the formal electronic document. Informal EMDs may also be electronically signed and tamper evident sealed. Finally, for pen and ink signing of paper documents, the esigning process may be omitted, or a substitute for electronic signing such as verifiably scanning the signatures or signed papers may be implemented.

Following the closing, the Borrower may receive 115 copies of the closing documents, again through an e-mail if desired, alternatively in traditional fashion. A post closing EQC run 116 accommodates a confirmation that the data among the various systems integrated with the ECP is consistent, and confirms that the data in the actual closing documents is accurate. Such runs may be performed by both the Closing Agent 116 and the Lender 117, to ensure that their own datasets remain accurate and consistent as well.

Finally, the ECP accommodates delivery 118 to an investor, such as on the secondary mortgage market. FIG. 7 is a display diagram 700 illustrating electronic loan delivery information 730 provided by an ECP in accordance with the present invention. This allows easy management of loans and their delivery. The information includes various columns for each loan, including the closing date 710, lender loan#712, primary borrower's last name 714, property street address 716, loan amount 718, interest rate 720, casefile ID 722, and order status 724. For any checked (708) loan, the delivery details may be viewed by pressing the "View Delivery Details" button 704. Such details would include conventional delivery information. For paper signing, delivery would be conventional, but corresponding information about delivery could still be conveyed if desired. Electronic documents could be directly transferred to an investor. Conveyed information includes information about the loan, whether the loan is MBS and what pool, and the type of execution.

Following the closing, the electronic ECP may also provide additional features, including but not limited to registry filing, an electronic vault for storing electronic documents, and electronic recording. The registry filing functionality may be variously provided, and reflects a registration of the ownership of the mortgage. For example, the registry may be updated to reflect the transfer of ownership from a lender to an investor, possibly in conjunction with the above described delivery functionality. One example of an electronic registry stores information relating to a transferable electronic record and the controller of an authoritative copy of the transferable electronic record. The electronic registry authenticates a true copy of the authoritative copy of the transferable electronic record, and accommodates registration of the transferable electronic record and transfer of legal rights associated therewith. An example of an electronic registry is described further in commonly assigned application Ser. No. 10/357,602, entitled "Electronic Registry for Authenticating Transferable Records" and filed on Feb. 4, 2003 by John A. Richards et al., the contents of which are hereby incorporated by reference.

The vault is the repository in which documents are housed. Electronic documents may also be held in a vault. The registry identifies who owns the note, whereas the vault identifies where it is stored. An investor will often keep an "investor package" but there are other documents related to the closing transaction that can be vaulted. The investor may also house these documents, or a lender may transfer the documents to a third party service, or undertake the function themselves. Conventional electronic document storage techniques may be implemented in conjunction with this functionality, and industry standards may determine the constraints and conditions of such storage. Additionally, service providers for the vaulting functionality could integrate with the ECP so that documents could be selected for vaulting through the ECP, with easy selection of providers.

Finally, electronic recording allows the closing agent to prepare documents and submit them to a county for electronic recording. Upon receipt of the documents and the appropriate payment, the county processes the fees and records the documents electronically. The recorded documents are returned to the sender in electronic form accompanied by a digital receipt. The electronic recording service may be provided by various parties including but not limited to an investor in the secondary mortgage market. Examples of electronic recording is as provided by Fannie Mae, and described further in provisional application Ser. No. 60/519,282, entitled "eRecording" and filed on Nov. 13, 2003 by Carmelo D. Bramante et al. (Attorney Docket No. 37540-06003), the contents of which are hereby incorporated by reference.

Figure 8A:
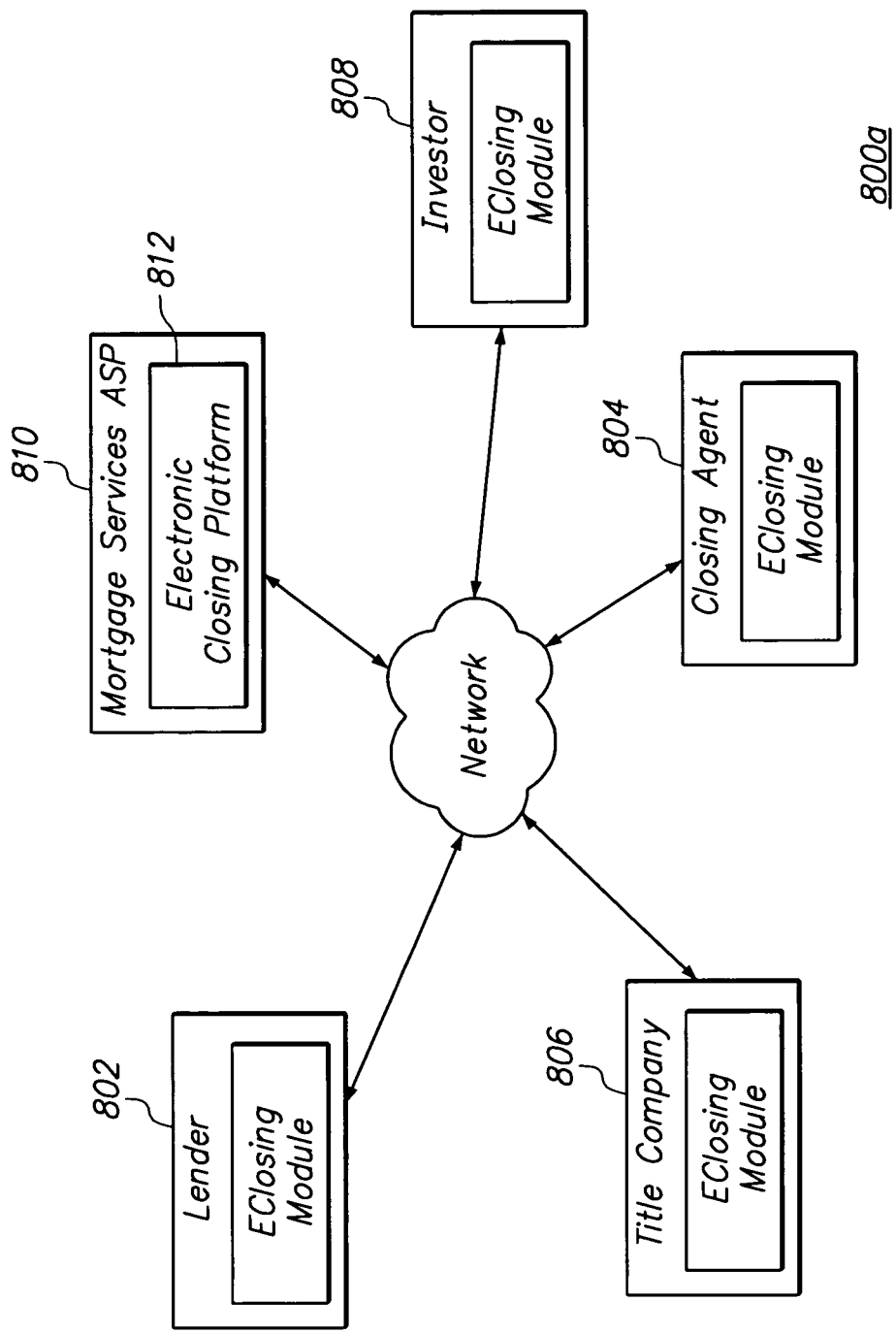
FIGS. 8A-B are schematic diagrams illustrating embodiments of systems in which an electronic closing platform operate in accordance with the present invention.
Figure 8B:
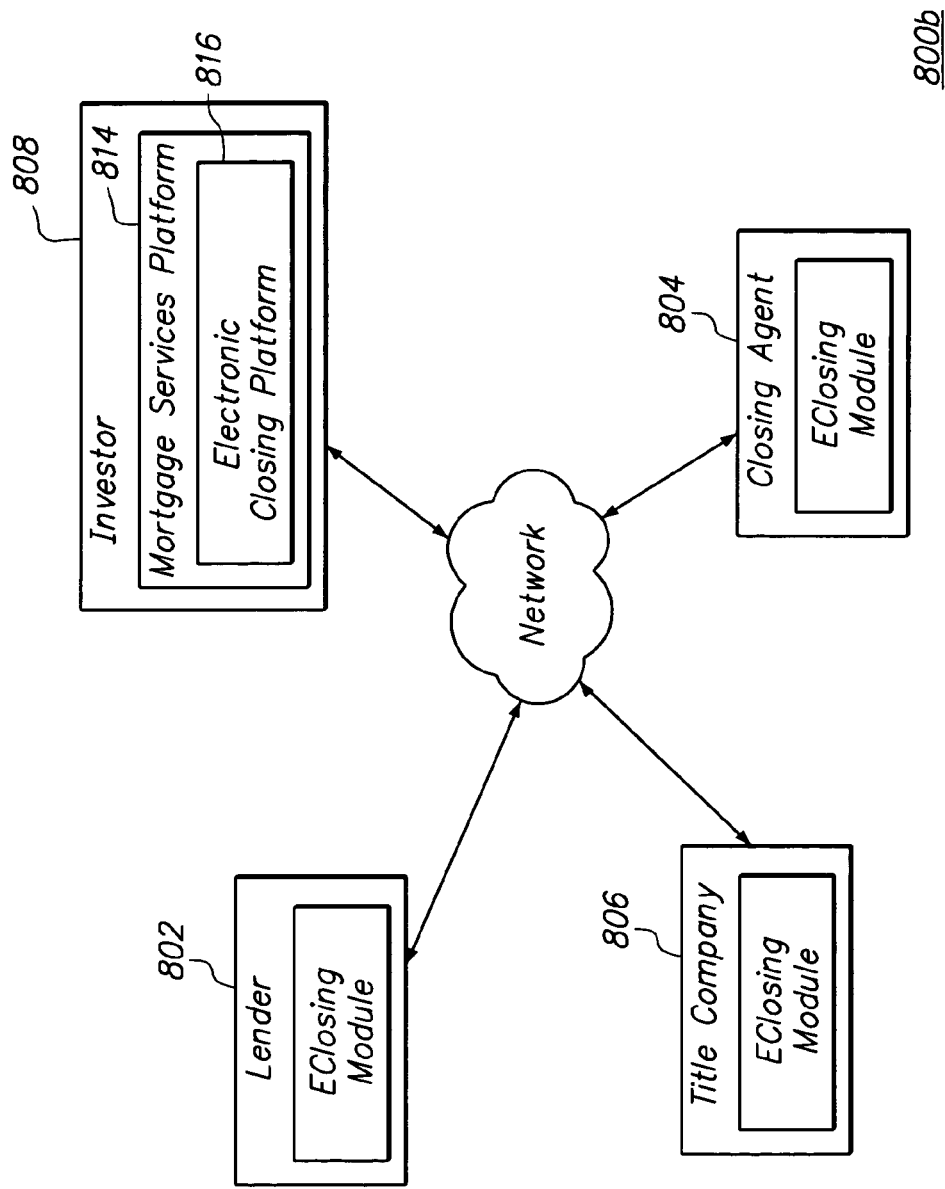

FIGS. 8A-B are schematic diagrams illustrating examples of computer systems 800a, 800b in which an ECP may operated. The lender 802, closing agent 804, title company 806, and investor 808 are each shown to include an eClosing module and may connect to a mortgage services ASP 810 that includes the electronic closing platform 812. The ASP 810 includes conventional features for registering the different parties and allows appropriate activities for mortgage transactions, such as the previously described creation of electronic documents for a closing package by the lender, the creation of closing documents by the closing agent, the receipt of title information from the title company, and other activities. Additionally, each of the parties 802-808 includes an eClosing module having functionality that allows the above described functionality through connection with the ECP. This may merely be an appropriately configured browser and registration with the mortgage services platform, or may include proprietary information that is provided to a registering entity upon completion of their registration.

Each of the parties 802-810 can be interconnected by a public network such as the Internet, and they can variously communicate using conventional architectures and protocols, such as according to a client server model implementing the TCP/IP communication protocol suite, and any necessary protocols for transmitting, accessing, displaying, printing, and otherwise using the above described electronic documents. Alternatively, a private network, a combination or public and private networks, or any conventional arrangement for conducting communications appropriate for the described subject matter can interconnect the parties.

As indicated in FIG. 8B, in some systems 800b a mortgage services platform 814 may be provided by one of the parties performing an existing role 802-808. Particularly, the investor may provide the mortgage services platform 814, which would provide services similar to the mortgage services ASP (810). In either case, the mortgage services preferably include the above described mortgage services platform 814. Although certain systems are shown, other systems including but not limited to those for the appraiser, mortgage insurance, hazard, flood certification, and loan servicing agent can similarly connect to the EQC system.

Figure 9:
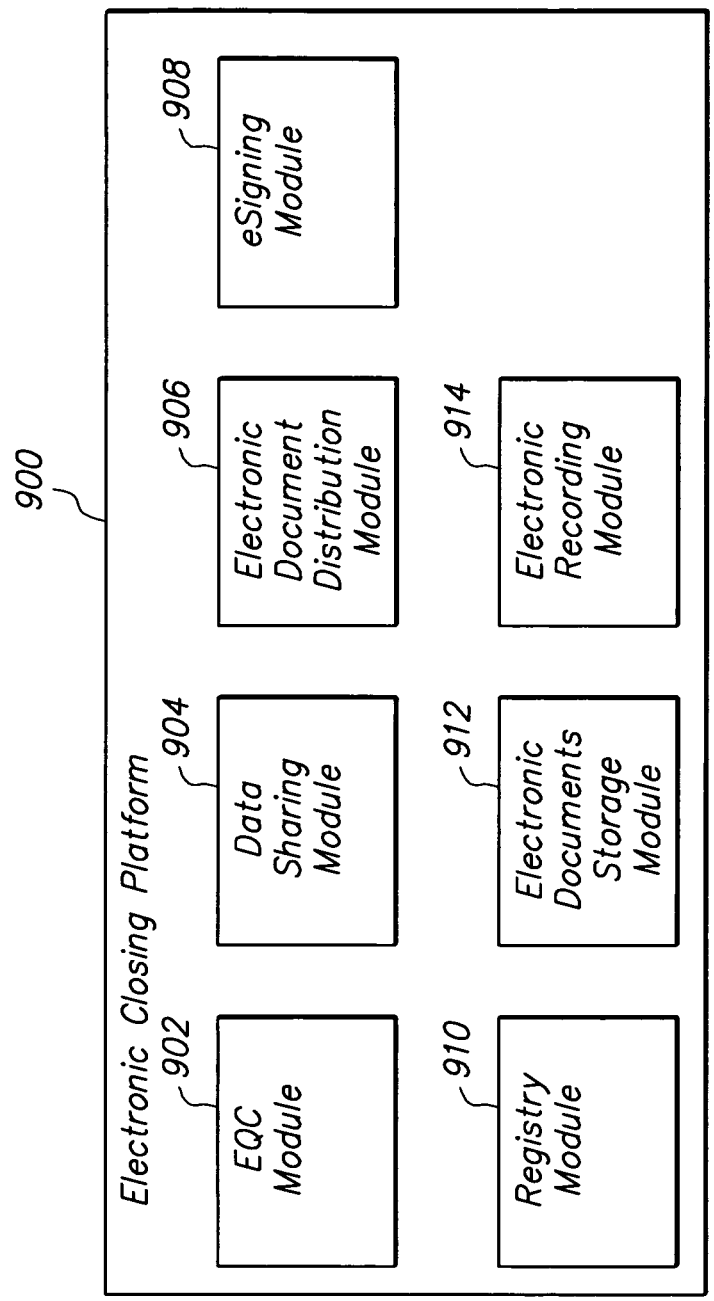
FIG. 9 is a block diagram illustrating an embodiment of an electronic closing platform in accordance with the present invention.

FIG. 9 is a block diagram illustrating an embodiment of an electronic closing platform 900 in accordance with the present invention. The ECP 900 is preferably provided as software, but may also be provided as hardware or firmware, or some combination of software, hardware and firmware. The ECP 900 includes an EQC module 902, data sharing module 904, electronic document distribution module 906, eSigning module 908, registry module 910, electronic document storage module 912, and electronic recording module 914. The electronic ECP 900 allows parties to register with the system using conventional procedures, and variously accommodates electronic closings that are implemented by Lenders, Closing Agents, and others, as described above. The data sharing module 904 and electronic document distribution module 906 respectively accommodate the transfer of data to and from the platform and parties, and to optionally implement electronic documents to do the same. Particularly, the data sharing module 904 is configured to receive lender and closing agent datasets through the above described interfaces, such as by uploading data from their respective systems. The data sharing module 904 is also in communication with a registration module that tracks the parties such as lenders, closing agents, and third party providers that interface with the system. The registration module can be considered to generally be part of the basic functionality of the electronic closing platform and need not be separately illustrated for an understanding of the invention. Still further, the data sharing module 904 allows parties to take advantage of previously entered data corresponding to a closing. For example, a closing agent may use data previously entered by a lender for a particular closing. This may be accommodated by automatically populating the closing agent database by identifying matching fields therein, and uploading the corresponding values. The EQC module 904 manages the previously introduced rules, receives data to be validated, and applies the appropriate rules to the data, returning results to requesting parties as described. The eSigning module 908 accommodates the electronic signing process by providing the above described interfaces through which the electronic signature configurations are established. It may also accommodate actual electronic signing, or such may be performed by the Closing Agent at the closing. Finally, the registry module 910, electronic document storage module 912, and electronic recording module 914 respectively provide the above described registry, vault, and recording functions.

Thus embodiments of the present invention produce and provide an electronic closing platform and related processes. Although the present invention has been described in considerable detail with reference to certain embodiments thereof, the invention may be variously embodied without departing from the spirit or scope of the invention. Therefore, the following claims should not be limited to the description of the embodiments contained herein in any way.

What is claimed is:

1. A method for providing an integrated electronic closing for a mortgage loan utilizing an electronic mortgage platform, the method comprising:

providing an electronic mortgage platform that performs the steps of:

receiving a lender dataset corresponding to a closing from a lender;

identifying a closing agent for the closing and receiving a closing agent dataset corresponding to the closing; and applying a quality control process to a closing transaction dataset corresponding to closing documents established by at least one of the lender and the closing agent prior to the closing, the quality control process applying rules to determine:
discrepancies between the lender dataset and the closing agent dataset;
whether a value is proper for a given field in the closing transaction dataset in accordance with rules to support the closing; and
whether the closing transaction dataset includes required fields in accordance with rules to support the closing.

2. The method of claim 1, further comprising:
accommodating an electronic signing of the closing documents at the closing.

3. The method of claim 2, wherein accommodating an electronic signing comprises automatically applying an electronic signature to a plurality of documents based upon a single signature action by a signer.

4. The method of claim 1, wherein applying the quality control process further comprises reporting determined discrepancies between the lender dataset and the closing agent dataset.

5. The method of claim 1, wherein applying the quality control process further comprises application of rules to the closing transaction dataset to ensure that the values within the closing transaction dataset are sufficient to support a related transaction.

6. The method of claim 5, wherein the related transaction is a sale of a mortgage note corresponding to the closing in the secondary mortgage market.

7. The method of claim 1, further comprising:
automatically populating the closing agent dataset with data corresponding to the closing based upon previous receipt of the lender dataset.

8. The method of claim 1, further comprising:
electronically updating a registry following the closing to reflect an ownership of a mortgage note corresponding to the closing.

9. The method of claim 1, further comprising:
accommodating storage of an electronic document corresponding to the closing in an electronic vault.

10. The method of claim 1, further comprising:
accommodating an electronic recording of a document corresponding to the closing with an authority.

11. An apparatus for providing an integrated electronic closing for a mortgage loan, the apparatus comprising:
means for receiving a lender dataset corresponding to a closing from a lender;
means for identifying a closing agent for the closing and receiving a closing agent dataset corresponding to the closing; and
means for applying a quality control process to a closing transaction dataset corresponding to closing documents established by at least one of the lender and the closing agent prior to the closing, the quality control process applying rules to determine:
discrepancies between the lender dataset and the closing agent dataset;
whether a value is proper for a given field in the closing transaction dataset in accordance with rules to support the closing; and
whether the closing transaction dataset includes required fields in accordance with rules to support the closing.

12. The apparatus of claim 11, further comprising:
means for accommodating an electronic signing of the closing documents at the closing.

13. The apparatus of claim 12, wherein accommodating an electronic signing comprises automatically applying an electronic signature to a plurality of documents based upon a single signature action by a signer.

14. The apparatus of claim 11, wherein applying the quality control process further comprises reporting determined discrepancies between the lender dataset and the closing agent dataset.

15. The apparatus of claim 11, wherein applying the quality control process further comprises application of rules to the closing transaction dataset to ensure that the values within the closing transaction dataset are sufficient to support a related transaction.

16. The apparatus of claim 15, wherein the related transaction is a sale of a mortgage note corresponding to the closing in the secondary mortgage market.

17. The apparatus of claim 11, further comprising:
means for automatically populating the closing agent dataset with data corresponding to the closing based upon previous receipt of the lender dataset.

18. The apparatus of claim 11, further comprising:
means for electronically updating a registry following the closing to reflect an ownership of a mortgage note corresponding to the closing.

19. The apparatus of claim 11, further comprising:
means for accommodating storage of an electronic document corresponding to the closing in an electronic vault.

20. The apparatus of claim 11, further comprising:
means for accommodating an electronic recording of a document corresponding to the closing with an authority.

21. An apparatus for providing an integrated electronic closing for a mortgage loan, the apparatus comprising:
a registration module, configured to identify a lender and a closing agent;
a data sharing module, in communication with the registration module, configured to receive a lender dataset corresponding to a closing from the lender and receive a closing agent dataset corresponding to the closing; and
a quality control module, in communication with the data sharing module, configured to apply a quality control process to a closing transaction dataset corresponding to closing documents established by at least one of the lender and the closing agent prior to the closing, the quality control process applying rules to determine:
discrepancies between the lender dataset and the closing agent dataset;
whether a value is proper for a given field in the closing transaction dataset in accordance with rules to support the closing; and
whether the closing transaction dataset includes required fields in accordance with rules to support the closing.

22. The apparatus of claim 21, further comprising:
an electronic signing module, which accommodates an electronic signing of the closing documents at the closing.

23. The apparatus of claim 22, wherein the electronic signing is accommodated by automatically applying an electronic signature to a plurality of documents based upon a single signature action by a signer.

24. The apparatus of claim 21, wherein applying the quality control process further comprises reporting determined discrepancies between the lender dataset and the closing agent dataset.

25. The apparatus of claim 21, wherein applying the quality control process applies rules to the closing transaction dataset to ensure that the values within the closing transaction dataset are sufficient to support a related transaction.

26. The apparatus of claim 25, wherein the related transaction is a sale of a mortgage note corresponding to the closing in the secondary mortgage market.

27. The apparatus of claim 21, wherein the data sharing module is further configured to automatically populate the closing agent dataset with data corresponding to the closing based upon previous receipt of the lender dataset.

28. The apparatus of claim 21, further comprising:
a registry module, which electronically updates a registry following the closing to reflect an ownership of a mortgage note corresponding to the closing.

29. The apparatus of claim 21, further comprising:
an electronic document storage module, which accommodates storage of an electronic document corresponding to the closing in an electronic vault.

30. The apparatus of claim 21, further comprising:
an electronic recording module, which accommodates an electronic recording of a document corresponding to the closing with an authority.

* * * * *